United States Patent
Kim (10) Patent No.: US 11,042,326 B2
(45) Date of Patent: Jun. 22, 2021

(54) DATA STORAGE DEVICE AND OPERATING METHOD THEREOF

(71) Applicant: SK hynix Inc., Gyeonggi-do (KR)

(72) Inventor: Woo Youl Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 18 days.

(21) Appl. No.: 16/706,121

(22) Filed: Dec. 6, 2019

(65) Prior Publication Data
US 2020/0192605 A1    Jun. 18, 2020

(30) Foreign Application Priority Data

Dec. 13, 2018 (KR) .................. 10-2018-0161244
Nov. 21, 2019 (KR) .................. 10-2019-0150235

(51) Int. Cl.
*G06F 3/06* (2006.01)

(52) U.S. Cl.
CPC .......... *G06F 3/0659* (2013.01); *G06F 3/0613* (2013.01); *G06F 3/0679* (2013.01)

(58) Field of Classification Search
CPC .... G06F 3/0613; G06F 3/0604; G06F 3/0659; G06F 3/0653; G06F 3/0679
USPC ......................................................... 711/103
See application file for complete search history.

(56) References Cited

FOREIGN PATENT DOCUMENTS

KR          101057161      8/2011
KR       1020170092951    8/2017

*Primary Examiner* — David Yi
*Assistant Examiner* — Zubair Ahmed
(74) *Attorney, Agent, or Firm* — IP & T Group LLP (57) ABSTRACT

A data storage device may include: a nonvolatile memory; and a controller configured to control an operation of the nonvolatile memory. When a command is received from a host, the controller transfers first state information as a response to the command to the host, the first state information including first time information indicating time difference from when the command is received to when a task corresponding to the command is generated and stored. When a task execution command is received from the host, the controller transfers second state information as a response to the task execution command to the host, the second state information including second time information indicating time difference from when the task execution command is received to when the task is completed.

18 Claims, 8 Drawing Sheets

FIG.12

DATA STORAGE DEVICE AND OPERATING METHOD THEREOF

CROSS-REFERENCE TO RELATED APPLICATION

The present application claims priority under 35 U.S.C. § 119(a) to Korean application number 10-2018-0161244, filed on Dec. 13, 2018, and Korean application number 10-2019-0150235, filed on Nov. 21, 2019, in the Korean Intellectual Property Office, which is incorporated herein by reference in its entirety.

BACKGROUND

1. Technical Field

Various embodiments generally relate to a semiconductor device, and more particularly, to a data storage device and an operating method thereof.

2. Related Art

In general, a semiconductor memory device may be a volatile memory device, such as a dynamic random access memory (DRAM) or a static random access memory (SRAM), or a volatile memory device, such as a flash memory, a ferroelectric random access memory (FRAM), a phase-change random access memory (PRAM) or a magnetic random access memory (MRAM). A volatile memory device loses data stored therein when power is removed, but a nonvolatile memory device retains stored data stored even though power is removed. In particular, a flash memory, which is a type of nonvolatile memory device, has high programming speed and low power consumption, and can store a large volume of data. Therefore, flash memory is widely used as a storage medium in various applications, such as an MP3 player, a digital camera, a solid state drive (SSD), an embedded multimedia card (eMMC) and a computer system, which require a low-power and high-capacity storage device. An eMMC, which is a data storage device using a nonvolatile memory, has a controller coupled thereto, and is mainly used in a mobile product such as a smart phone or tablet PC.

SUMMARY

Various embodiments are directed to a data storage device capable of checking accurate latency for command processing and an operating method thereof.

In an embodiment, a data storage device may include: a nonvolatile memory; and a controller configured to control an operation of the nonvolatile memory. When a command is received from a host device, the controller may transfer first state information as a response to the command to the host device, the first state information including first time information indicating time difference from when the command is received to when a task corresponding to the command is generated and stored. When a task execution command is received from the host device, the controller may transfer second state information as a response to the task execution command to the host device, the second state information including second time information indicating time difference from when the task execution command is received to when the task is completed.

In an embodiment, there is provided an operating method of a data storage device which includes a nonvolatile memory device and a controller configured to control an operation of the nonvolatile memory device. The operating method may include: generating and storing a task corresponding to a command received from a host device; transferring first state information as a response to the command to the host device, the first state information including first time information indicating time difference from when the command is received to when the task is stored; controlling the nonvolatile memory to perform an operation corresponding to the task according to a task execution command received from the host device; and transferring second state information as a response to the task execution command to the host device, the second state information including second time information indicating time difference from when the task execution command is received to when the task is completed.

In an embodiment, a data storage device may include: a memory device; and a controller configured to provide first and second processing time information to an external element. The first processing time information represents time taken for the controller to generate a task in response to a first command provided from the external element, and the second processing time information represents time taken for the controller to complete an execute of the task in response to a second command provided from the external element.

DETAILED DESCRIPTION

In the present invention, advantages, features and methods for achieving them will become more apparent after a reading of the following exemplary embodiments taken in conjunction with the drawings. The present invention may, however, be embodied in different forms and should not be construed as being limited to the embodiments set forth herein. Rather, these embodiments are provided to describe the present invention in detail to the extent that a person skilled in the art to which the invention pertains can easily enforce the technical concept of the present invention. It is noted that reference to "an embodiment" does not necessarily mean only one embodiment, and different references to "an embodiment" are not necessarily to the same embodiment(s).

It is to be understood herein that embodiments of the present invention are not limited to the particulars shown in the drawings and that the drawings are not necessarily to scale and in some instances proportions may have been exaggerated in order to more clearly depict certain features of the invention. While particular terminology is used herein, it is to be appreciated that the terminology used herein is for the purpose of describing particular embodiments only and is not intended to limit the scope of the present invention.

As used herein, the term "and/or" includes any and all combinations of one or more of the associated listed items. It will be understood that when an element is referred to as being "on," "connected to" or "coupled to" another element, it may be directly on, connected or coupled to the other element or intervening elements may be present. As used herein, a singular form is intended to include plural forms as well, unless the context clearly indicates otherwise. It will be further understood that the terms "includes" and/or "including," when used in this specification, specify the presence of at least one stated feature, step, operation, and/or element, but do not preclude the presence or addition of one or more other features, steps, operations, and/or elements thereof.

Hereafter, exemplary embodiments will be described in detail with reference to the accompanying drawings.

Figure 1:
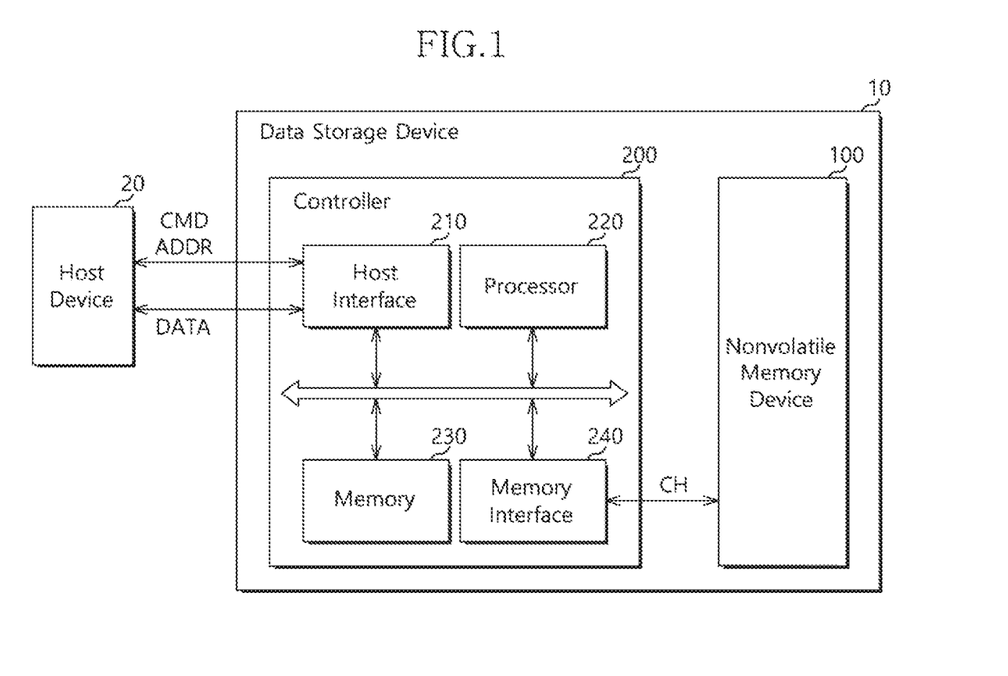
FIG. 1 is a diagram illustrating a configuration of a data storage device in accordance with an embodiment.

FIG. 1 is a diagram illustrating a configuration of a data storage device 10 in accordance with an embodiment.

Referring to FIG. 1, the data storage device 10 may store data accessed by a host 20 such as a mobile phone, MP3 player, laptop computer, desktop computer, game machine, TV or in-vehicle infotainment system. The data storage device 10 may also be referred to as a memory system.

The data storage device 10 may be fabricated or configured as any one of various types of storage devices depending on an interface protocol coupled to the host device 20. For example, the data storage device 10 may be configured as any of a solid state drive (SSD), a multimedia card (MMC) such as an eMMC, RS-MMC or micro-MMC, a secure digital (SD) card such as a mini-SD or micro-SD card, a universal serial bus (USB) storage device, a universal flash storage (UFS) device, a personal computer memory card international association (PCMCIA) card-type storage device, a peripheral component interconnection (PCI) card-type storage device, a PCI express (PCI-E) card-type storage device, a compact flash (CF) card, a smart media card and a memory stick.

The data storage device 10 may be fabricated as any one of various types of packages. For example, the data storage device 10 may be fabricated as any of a package-on-package (POP), a system-in-package (SIP), a system-on-chip (SOC), a multi-chip package (MCP), a chip-on-board (COB), a wafer-level fabricated package (WFP) and a wafer-level stack package (WSP).

The data storage device 10 may include a nonvolatile memory 100 and a controller 200.

The nonvolatile memory 100 may operate as a storage medium of the data storage device 10. The nonvolatile memory 100 may be configured as any one of various types of nonvolatile memory devices including a NAND flash memory device, a NOR flash memory device, a ferroelectric random access memory (FRAM) using a ferroelectric capacitor, a magnetic RAM (MRAM) using a tunneling magneto-resistive (TMR) film, a phase change RAM (PRAM) using chalcogenide alloys, and a resistive RAM (ReRAM) using transition metal oxide, depending on memory cells.

FIG. 1 illustrates that the data storage device 10 includes one nonvolatile memory 100. However, this is merely an embodiment; in another embodiment, the data storage device 10 may include a plurality of nonvolatile memories. Principles of the present disclosure, described in the context of the data storage device 10 with one nonvolatile memory may be applied in the same manner to the data storage device 10 including a plurality of nonvolatile memories as would be understood by those skilled in the art.

The nonvolatile memory 100 may include a memory cell array (not illustrated) having a plurality of memory cells arranged at the respective intersections between a plurality of bit lines (not illustrated) and a plurality of word lines (not illustrated). The memory cell array may include a plurality of memory blocks, and each of the memory blocks may include a plurality of pages.

For example, each of the memory cells of the memory cell array may be configured as a single level cell (SLC) capable of storing 1-bit data or a multi-level cell (MLC) capable of storing 2 or more-bit data. For example, the MLC may store 2-bit data, 3-bit data, 4-bit data or more bits of data. In general, a memory cell for storing 2-bit data may be referred to as an MLC, a memory cell for storing 3-bit data may be referred to as a triple level cell (TLC), and a memory cell for storing 4-bit data may be referred to as a quadruple level cell (QLC). In the context of the discussion below, however, memory cells storing 2 or more-bit data may be considered as MLCs.

The memory cell array may include one or more of SLCs and MLCs. Furthermore, the memory cell array may include memory cells with a two-dimensional horizontal structure or memory cells with a three-dimensional vertical structure.

The controller 200 may control overall operations of the data storage device 10 by driving firmware or software loaded to the memory 230. The controller 200 may decode and drive a code-based instruction or algorithm such as firmware or software. The controller 200 may be implemented in hardware or a combination of hardware and software.

The controller 200 may include a host interface 210, a processor 220, a memory 230 and a memory interface 240. Although not illustrated in FIG. 1, the controller 200 may further include an error correction code (ECC) engine which generates parity data by performing ECC encoding on write data provided from the host 20, and performs ECC decoding on read data read from the nonvolatile memory 100 using the parity data.

The host interface 210 may interface the host 20 and the data storage device 10 according to a protocol of the host 20. For example, the host interface 210 may communicate with the host 20 through any of various protocols including USB (universal serial bus), UFS (universal flash storage), MMC (multimedia card), PATA (parallel advanced technology attachment), SATA (serial advanced technology attachment), SCSI (small computer system interface), SAS (serial attached SCSI), PCI (peripheral component interconnection) and PCI-E (PCI express).

The processor 220 may include a micro control unit (MCU) and/or a central processing unit (CPU). The processor 220 may process a request transferred from the host 20. In order to process the request transferred from the host 20, the processor 220 may drive a code-based instruction or algorithm loaded to the memory 230, i.e., firmware, and control the nonvolatile memory 100 and internal function blocks such as the host interface 210, the memory 230 and the memory interface 240.

The processor 220 may generate control signals to control an operation of the nonvolatile memory 100 based on requests transferred from the host 20, and provide the generated control signals to the nonvolatile memory 100 through the memory interface 240.

The memory 230 may be configured as a random access memory (RAM) such as a dynamic RAM (DRAM) or static RAM (SRAM). The memory 230 may store the firmware driven by the processor 220. Furthermore, the memory 230 may store data for driving the firmware, for example, metadata. That is, the memory 230 may operate as a working memory of the processor 220.

The memory 230 may include a data buffer for temporarily storing write data to be transferred from the host 20 to the nonvolatile memory 100 or read data to be transferred from the nonvolatile memory 100 to the host 20. That is, the memory 230 may operate as a buffer memory.

The memory interface 240 may control the nonvolatile memory 100 under control of the processor 220. The memory interface 240 may also be referred to as a memory controller. The memory interface 240 may provide control signals to the nonvolatile memory 100. The control signals may include a command, address and operation control signal for controlling the nonvolatile memory 100. The memory interface 240 may provide data stored in the data buffer to the nonvolatile memory 100 or store data transferred from the nonvolatile memory 100 in the data buffer.

Figure 2:
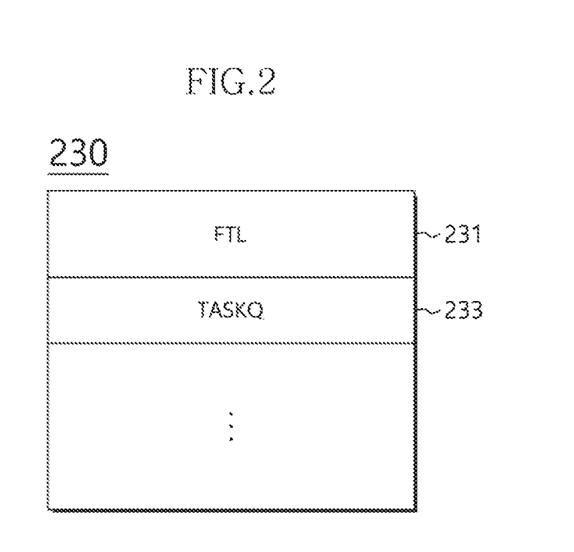
FIG. 2 is a diagram illustrating a memory of FIG. 1.

FIG. 2 is a diagram illustrating the memory 230 of FIG. 1.

Referring to FIG. 2, the memory 230 in accordance with the present embodiment may include a first region 231 in which a flash translation layer (FTL) is stored and a second region 233 used as a task queue for queuing a task which is generated based on a command received from the host device 20.

When the nonvolatile memory 100 is configured as a flash memory device, the processor 220 may control a unique operation of the nonvolatile memory 100, and drive software referred to as the FTL in order to provide device compatibility to the host 20. As the FTL is driven, the host 20 may recognize and use the data storage device 10 as a general storage device such as a hard disk.

The FTL stored in the first region R1 of the memory 230 may include modules for performing various functions and metadata required for driving the respective modules. The FTL may be stored in a system region (not illustrated) of the nonvolatile memory 100. When the data storage device 10 is powered on, the FTL may be read from the system region of the nonvolatile memory 100, and loaded to the first region R1 of the memory 230.

A task may be generated by the processor 220 and stored in the second region of the memory 230. The task may include the same information as a command corresponding to the task. For example, the task may include a type of the command received from the host device 20, a start logical address and data size information (or length information of logical addresses corresponding to the command). When a command is received from the host device 20, the processor 220 may generate a task corresponding to the received command, and queue the generated task in the task queue 233 of the memory 230. The command received from the host device 20 may be a command related to operations to be performed by the nonvolatile memory 100 of the data storage device 10. For example, the command may include a read command, a write command, an erase command and the like, but the present embodiment is not limited thereto.

Referring to FIG. 2, the memory 230 includes only the first region R1 storing the FTL and the second region R2 used as the task queue. As those skilled in the art understand, the memory 230 need not be limited to these two regions; rather, the memory 230 may include other regions for various uses, such as a region used as a write data buffer for temporarily storing write data, a region used as a read data buffer for temporarily storing read data, and a region used as a map cache buffer for caching map data, in addition to the regions illustrated in FIG. 2.

Figure 3:
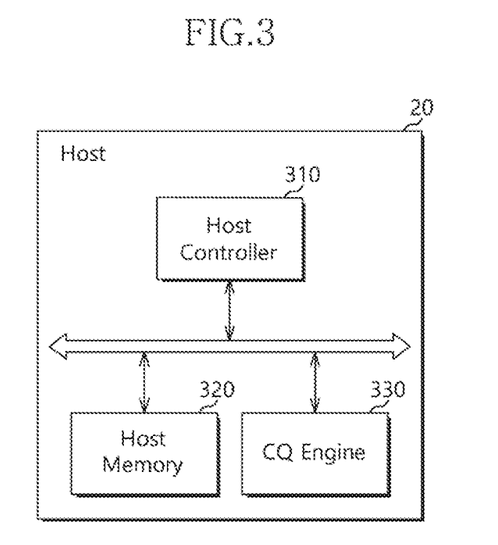
FIG. 3 is a diagram illustrating a configuration of a host device of FIG. 1.

FIG. 3 is a diagram illustrating the configuration of the host device 20 of FIG. 1.

Referring to FIG. 3, the host 20 may include a host controller 310, a host memory 320 and a command queue (CQ) engine 330.

The host controller 310 may be configured to control overall operations of the host 20. For example, the host controller 310 may include a micro control unit (MCU) and a central processing unit (CPU).

The host controller 310 may generate a description for generating a command to be provided to the data storage device 10, and store the generated description in the host memory 320.

Figure 4:
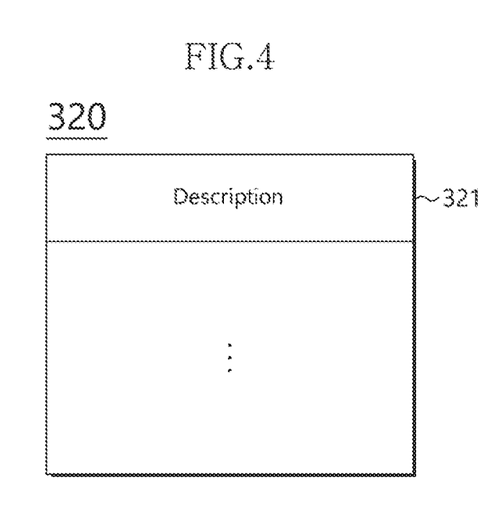
FIG. 4 is a diagram illustrating a host device memory of FIG. 3.

FIG. 4 is a diagram illustrating the configuration of the host memory 320 of FIG. 3.

The host memory 320 may include a description region 321 for storing descriptions generated by the host controller 310. FIG. 4 illustrates that the host memory 320 includes only the description region 321. However, the present embodiment is not limited thereto, as those skilled in the art will understand that the host device memory 320 may further include regions for various uses.

Figure 5:
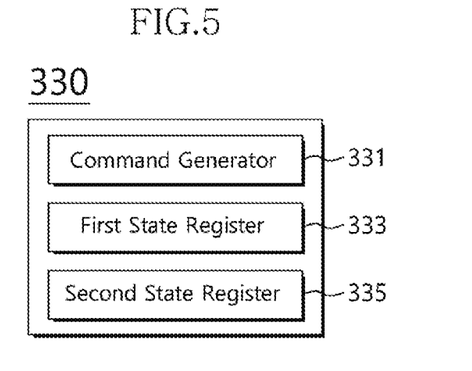
FIG. 5 is a diagram illustrating a configuration of a command queue (CQ) engine of FIG. 3.

FIG. 5 is a diagram illustrating the configuration of the CQ engine of FIG. 3.

The CQ engine 330 may include a command generator 331, a first state register 333 and a second state register 335. Although not illustrated in FIG. 5, the CQ engine 330 may further include a controller (not illustrated) for controlling overall operations of the CQ engine 330.

The command generator 331 may fetch a description stored in the host memory 320, and generate a command to be provided to the data storage device 10, based on the fetched description. The controller of the CQ engine 330 may provide the command generated by the command generator 331 to the data storage device 10. The controller of the CQ engine 330 may periodically check whether a new description is stored in the description region 321 of the host memory 320. When a new description is stored in the description region 321, the controller of the CQ engine 330 may fetch the new description from the description region 321 and provide the fetched description to the command generator 331. For example, the controller of the CQ engine 330 may check a new description stored in the description region 321, through a polling method.

The first state register 333 may be configured to store first state information received from the data storage device 10. The first state information may include first time information and task generation state information indicating whether the data storage device 10 is ready to execute a task corresponding to a command received from the host 20. The first time information may indicate time taken from when the command is received from the host 20 to when a task corresponding to the received command is queued in the task queue 233.

The processor 220 may calculate the time from when the command is received from the host 20 to when the task corresponding to the received command is generated and stored, and include the calculated time as the first time information in the first state information. That is, the first state information may include the first time information and the task generation state information indicating whether the task corresponding to the command is generated. For example, the first state information may include a plurality of bits, some bits of the plurality of bits may be set to indicate the task generation state information, and the other bits of the plurality of bits may be set to indicate the first time information.

The second state register 335 may be configured to store second state information received from the data storage device 10. The second state information may include second time information and task execution state information indicating whether the task is completed. The second time information may include information indicating time from when a task execution command is received from the host 20 to when the corresponding task is completed.

For example, when the first state information is received from the data storage device 10, the host controller 310 may store the received first state information in the first state register of the CQ engine 330, and transfer the task execution command to the data storage device 10. The task execution command may be a command for executing one or more of the tasks queued in the task queue 233 of the data storage device 10.

When the task execution command is received from the host 20, the processor 220 of the data storage device 10 may dequeue the task corresponding to the received task execution command from the task queue 233, and control the nonvolatile memory 100 to perform an operation corresponding to the dequeued task. When the operation corresponding to the task is completed, the processor 220 may transfer the second state information to the host 20, the second state information indicating that the task corresponding to the task execution command received from the host 20 is completed.

The processor 220 may calculate the time from when the task execution command is received from the host 20 to when the task corresponding to the received task execution command is completed, and include the calculated time as the second time information in the second state information. That is, the second state information may include the second time information and the task execution state information indicating whether the task is completed. For example, the second state information may include a plurality of bits, some bits of the plurality of bits may be set to indicate the task execution state information, and the other bits of the plurality of bits may be set to indicate the second time information.

The host controller 310 may store the second state information received from the data storage device 10 in the second state register 335 within the CQ engine 330.

Therefore, the first time information and the second time information may be stored in the CQ engine 330 of the host 20. The first time information may indicate the processing time taken by the data storage device 10 from when the command is received from the CQ engine 330 of the host 20 to when the task corresponding to the received command is generated and stored, and the second time information may indicate the processing time taken by the data storage device 10 from when the task execution command is received from the CQ engine 330 of the host 20 to when the corresponding task is completed.

As such, the data storage device 10 may provide the host 20 with the information on the time taken to generate the task in response to the command and the time taken to complete the task in response to the task execution command, which makes it possible to accurately check latency for command processing in the data storage device 10.

Figure 6:
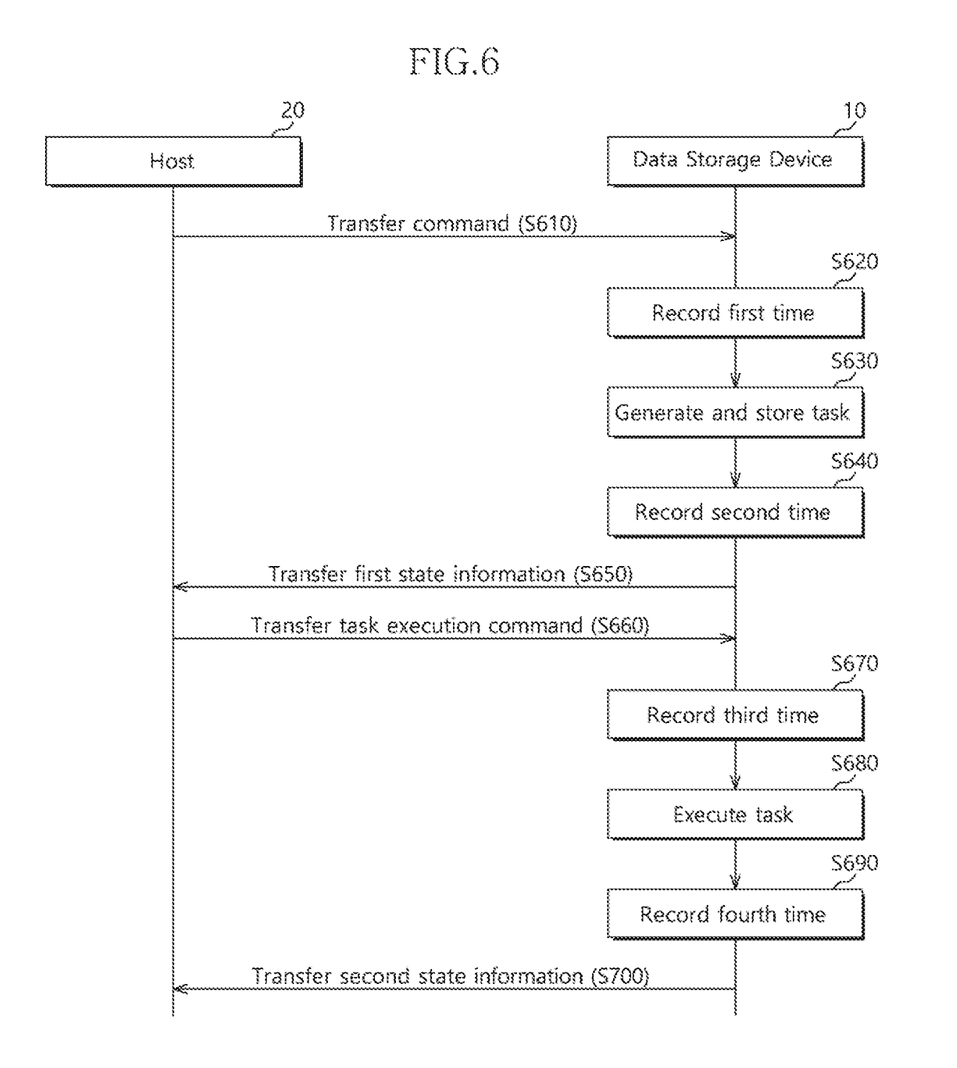
FIG. 6 is a flowchart illustrating an operation of a data storage device in accordance with an embodiment.

FIG. 6 is a flowchart illustrating an operating method of the data storage device 10 in accordance with an embodiment. In order to describe the operating method of the data storage device 10 in accordance with the present embodiment with reference to FIG. 6, one or more of FIGS. 1 to 5 may be referred to.

In step S610, the host 20 may transfer a command to the data storage device 10. The command may require an operation of the nonvolatile memory 100 of the data storage device 10. For example, the command may include a read command, a write command, an erase command and the like, but the present embodiment is not limited thereto. For example, the command may include information indicating the type of the command, a start logical address and data size information (or the length information of logical addresses corresponding to the command), but the present embodiment is not limited thereto. Since the process in which the host 20 generates and stores a command has been described above, the detailed descriptions thereof are omitted herein.

In step S620, the processor 220 of the data storage device 10 may record a first time point indicating when the command is received from the host 20.

In step S630, the processor 220 may generate a task corresponding to the command received from the host 20, and queue (or store) the generated task in the task queue 233 within the memory 230. The task may be generated to include the same information as the information included in the command.

In step S640, the processor 220 may record a second time point indicating when the generated task is stored in the task queue 233. Although not illustrated in FIG. 6, the processor 220 may generate first state information including first time information indicating difference between the first and second time points and task generation state information indicating that the task is generated.

In step S650, the processor 220 may transfer the generated first state information to the host 20.

In step S660, the host 20 may transfer a task execution command to the data storage device 10. Although not illustrated in FIG. 6, the host 20 may store the first state information received from the data storage device 10 in the first state register 333 within the CQ engine 330 in step S650, before transferring the task execution command to the data storage device 10.

In this step, the task execution command transferred to the data storage device 10 by the host 20 may be an execution command for the task corresponding to the command transferred to the data storage device 10 in step S610 or an execution command for a task which does not correspond to the command.

In step S670, the processor 220 of the data storage device 10 may record a third time point indicating when the task execution command is received from the host 20.

In step S680, the processor 220 may fetch a task corresponding to the task execution command from the task queue 233 of the memory 230, and control the nonvolatile memory 100 to perform an operation corresponding to the fetched task.

In step S690, the processor 220 may record a fourth time point indicating when the task is completed. Although not illustrated in FIG. 6, the processor 220 may generate second state information including second time information indicating difference between the third and fourth time points and task execution state information indicating the execution state of the task.

In step S700, the processor 220 may transfer the generated second state information to the host 20. Although not illustrated in FIG. 6, the host 20 may store the second state information received from the data storage device 10 in the second state register 335 within the CQ engine 330.

In accordance with the present embodiment, the data storage device and the operating method may provide the host with information corresponding to latency for command processing within the data storage device, thereby easily checking accurate latency for command processing within the data storage device.

Figure 7:
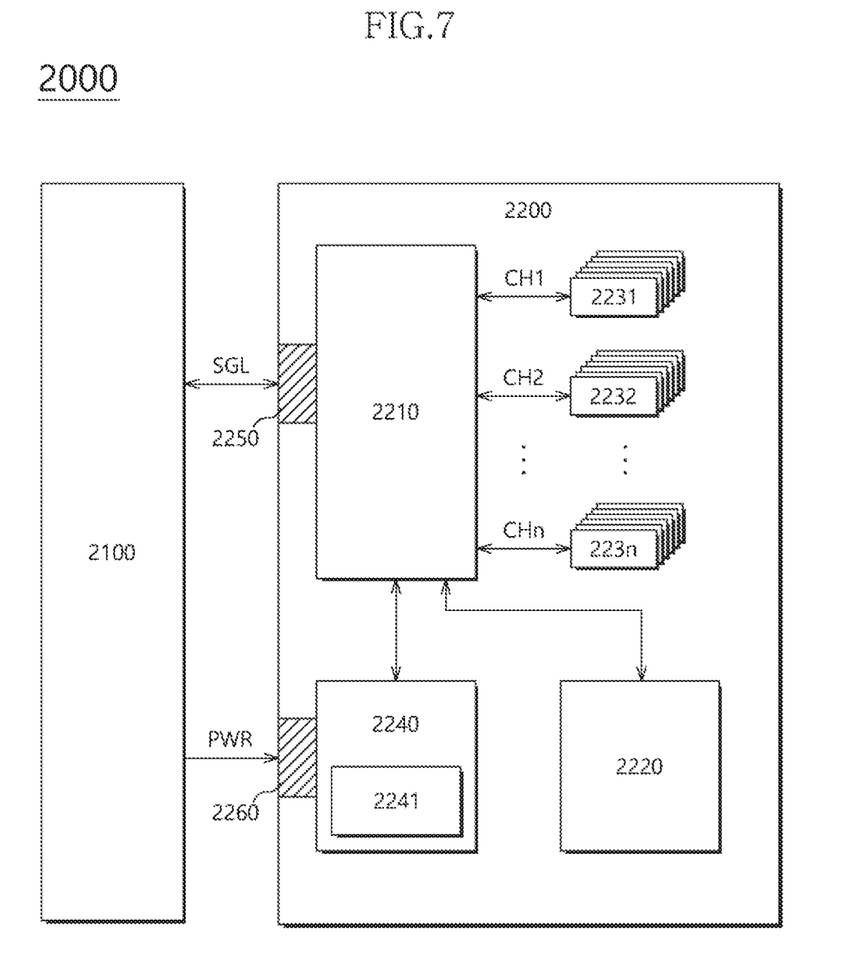
FIG. 7 is a diagram illustrating a data processing system including a solid state drive (SSD) in accordance with an embodiment.

FIG. 7 illustrates a data processing system including a solid state drive (SSD) in accordance with an embodiment. Referring to FIG. 7, the data processing system 2000 may include a host device 2100 and an SSD 2200.

The SSD 2200 may include a controller 2210, a buffer memory device 2220, nonvolatile memory devices 2231 to 223n, a power supply 2240, a signal connector 2250 and a power connector 2260.

The controller 2210 may control overall operations of the SSD 2200.

The buffer memory device 2220 may temporarily store data which are to be stored in the nonvolatile memory devices 2231 to 223n. Furthermore, the buffer memory device 2220 may temporarily store data read from the nonvolatile memory devices 2231 to 223n. The data which are temporarily stored in the buffer memory device 2220 may be transferred to the host device 2100 or the nonvolatile memory devices 2231 to 223n under control of the controller 2210.

The nonvolatile memory devices 2231 to 223n may be used as storage media of the SSD 2200. The nonvolatile memory devices 2231 to 223n may be coupled to the controller 2210 through a plurality of channels CH1 to CHn, respectively. Each of the reference numerals 2231 to 223n may represent one or more nonvolatile memory devices, and in the latter case more than one nonvolatile memory device may be coupled to the same channel. The nonvolatile memory devices coupled to one channel may be coupled to the same signal bus and data bus.

The power supply 2240 may provide power PWR inputted through the power connector 2260 into the SSD 2200. The power supply 2240 may include an auxiliary power supply 2241. The auxiliary power supply 2241 may supply power to properly turn off the SSD 2200, when a sudden power off occurs. The auxiliary power supply 2241 may include large capacitors capable of storing power PWR.

The controller 2210 may exchange signals SGL with the host device 2100 through the signal connector 2250. The signal SGL may include a command, address, data and the like. The signal connector 2250 may be configured as any of various types of connectors depending on an interface method between the host device 2100 and the SSD 2200.

Figure 8:
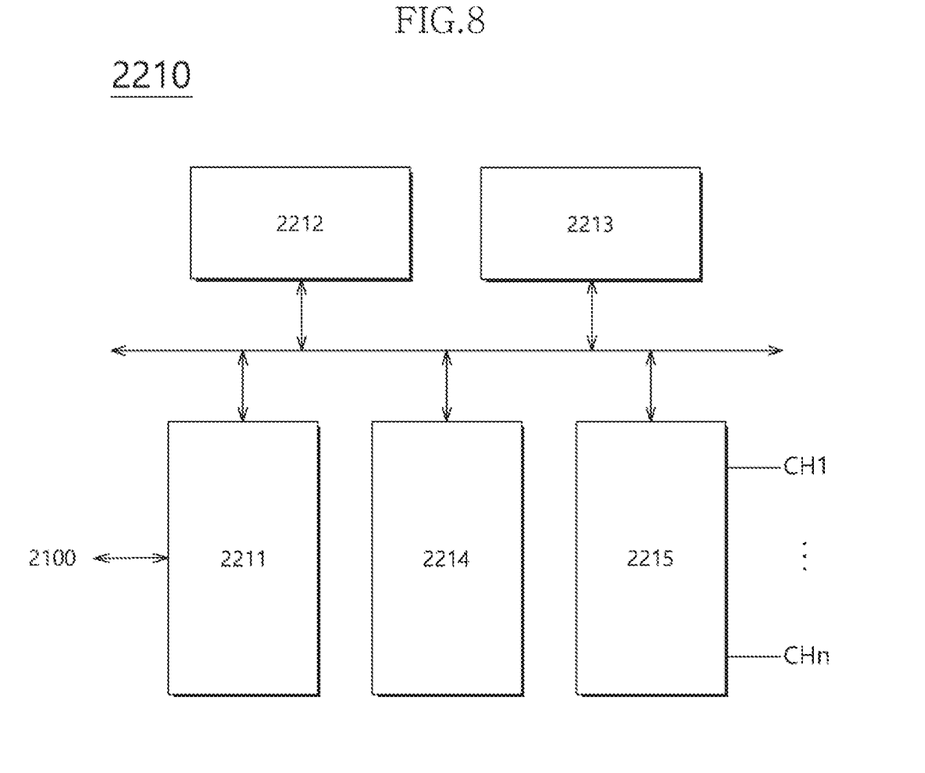
FIG. 8 is a diagram illustrating a configuration of a controller, such as that of FIG. 7.

FIG. 8 illustrates a configuration of the controller of FIG. 7. Referring to FIG. 8, the controller 2210 may include a host interface 2211, a control component 2212, a RAM 2213, an ECC component 2214 and a memory interface 2215.

The host interface 2211 may interface the host device 2100 and the SSD 2200 according to a protocol of the host device 2100. For example, the host interface 2211 may communicate with the host device 2100 through any one of various protocols including secure digital, USB (Universal Serial Bus), MMC (Multi-Media Card), eMMC (Embedded MMC), PCMCIA (Personal Computer Memory Card International Association), PATA (Parallel Advanced Technology Attachment), SATA (Serial Advanced Technology Attachment), SCSI (Small Computer System Interface), SAS (Serial Attached SCSI), PCI (Peripheral Component Interconnection), PCI-E (PCI Express) and UFS (Universal Flash Storage). The host interface 2211 may perform a disk emulation function which supports the host device 2100 to recognize the SSD 2200 as a universal data storage device, for example, a hard disk drive (HDD).

The control component 2212 may analyze and process the signal SGL received from the host device 2100. The control component 2212 may control operations of internal function blocks according to firmware or software for driving the SSD 2200. The RAM 2213 may be used as a working memory for driving such firmware or software.

The ECC component 2214 may generate parity data of the data to be transferred to the nonvolatile memory devices 2231 to 223n. The generated parity data and the data may be stored in the nonvolatile memory devices 2231 to 223n. The ECC component 2214 may detect an error of data read from the nonvolatile memory devices 2231 to 223n based on the parity data. When the detected error falls within a correctable range, the ECC component 2214 may correct the detected error.

The memory interface 2215 may provide a control signal such as a command and address to the nonvolatile memory devices 2231 to 223n, under control of the control component 2212. The memory interface 2215 may exchange data with the nonvolatile memory devices 2231 to 223n, under control of the control component 2212. For example, the memory interface 2215 may provide data stored in the buffer memory device 2220 to the nonvolatile memory devices 2231 to 223n, or provide data read from the nonvolatile memory devices 2231 to 223n to the buffer memory device 2220.

Figure 9:
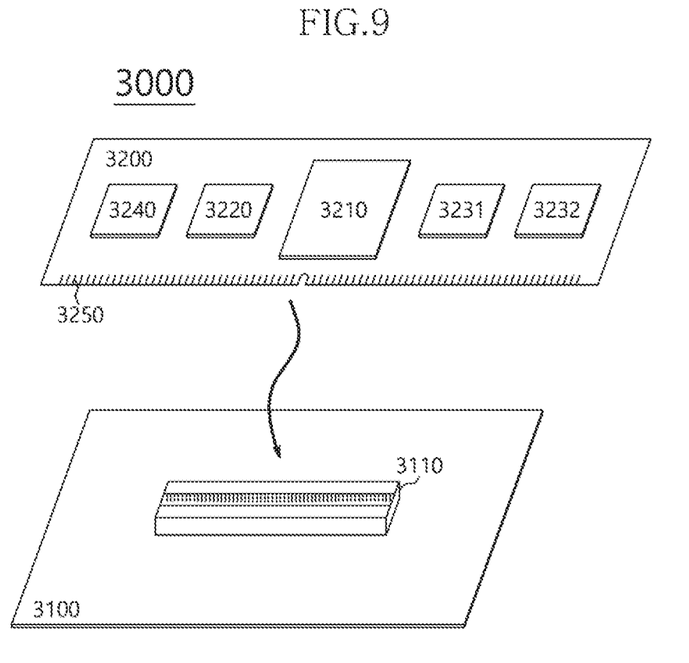
FIG. 9 is a diagram illustrating a data processing system including a data storage device in accordance with an embodiment.

FIG. 9 illustrates a data processing system including a data storage device in accordance with an embodiment. Referring to FIG. 9, the data processing system 3000 may include a host device 3100 and a data storage device 3200.

The host device 3100 may be configured as a board such as a PCB. Although not illustrated in FIG. 9, the host device 3100 may include internal function blocks for performing a function of the host device.

The host device 3100 may include a connection terminal 3110 such as a socket, slot or connector. The data storage device 3200 may be mounted on the connection terminal 3110.

The data storage device 3200 may be configured as a board such as a PCB. The data storage device 3200 may be referred to as a memory module or memory card. The data storage device 3200 may include a controller 3210, a buffer memory device 3220, nonvolatile memory devices 3231 and 3232, a power management integrated circuit (PMIC) 3240 and a connection terminal 3250.

The controller 3210 may control overall operations of the data storage device 3200. The controller 3210 may be configured in the same manner as the controller 2210 illustrated in FIG. 8.

The buffer memory device 3220 may temporarily store data which are to be stored in the nonvolatile memory devices 3231 and 3232. Furthermore, the buffer memory device 3220 may temporarily store data read from the nonvolatile memory devices 3231 and 3232. The data which are temporarily stored in the buffer memory device 3220 may be transferred to the host device 3100 or the nonvolatile memory devices 3231 and 3232 under control of the controller 3210.

The nonvolatile memory devices 3231 to 3232 may be used as storage media of the data storage device 3200.

The PMIC 3240 may provide power received through the connection terminal 3250 into the data storage device 3200. The PMIC 3240 may manage the power of the data storage device 3200 under control of the controller 3210.

The connection terminal 3250 may be coupled to the connection terminal 3110 of the host device. Through the connection terminal 3250, signals and power may be transferred between the host device 3100 and the data storage device 3200, the signals including a command, address, data and the like. The connection terminal 3250 may be configured in any of various ways depending on an interface method between the host device 3100 and the data storage device 3200. The connection terminal 3250 may be disposed at or on any side of the data storage device 3200.

Figure 10:
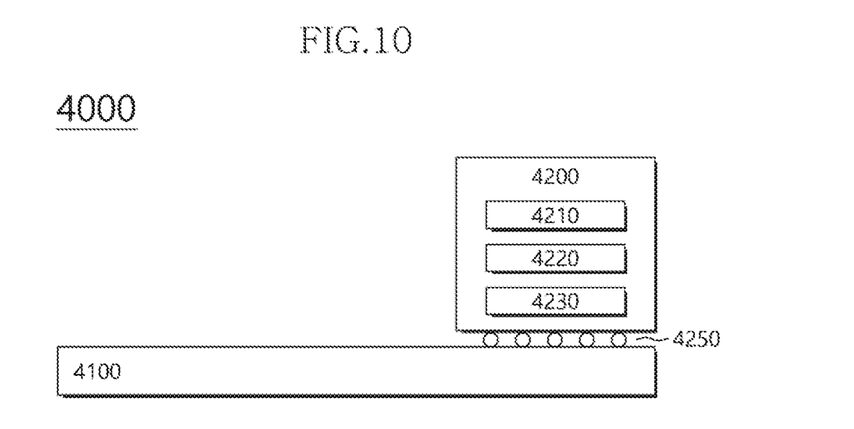
FIG. 10 is a diagram illustrating a data processing system including a data storage device in accordance with an embodiment.

FIG. 10 illustrates a data processing system including a data storage device in accordance with an embodiment. Referring to FIG. 10, the data processing system 4000 may include a host device 4100 and a data storage device 4200.

The host device 4100 may be configured as a board such as a PCB. Although not illustrated in FIG. 10, the host device 4100 may include internal function blocks for performing a function of the host device.

The data storage device 4200 may be configured as a surface mount package. The data storage device 4200 may be mounted on the host device 4100 through solder balls 4250. The data storage device 4200 may include a controller 4210, a buffer memory device 4220 and a nonvolatile memory device 4230.

The controller 4210 may control overall operations of the data storage device 4200. The controller 4210 may be configured in the same manner as the controller 2210 illustrated in FIG. 8.

The buffer memory device 4220 may temporarily store data which are to be stored in the nonvolatile memory device 4230. Furthermore, the buffer memory device 4220 may temporarily store data read from the nonvolatile memory device 4230. The data which are temporarily stored in the buffer memory device 4220 may be transferred to the host device 4100 or the nonvolatile memory device 4230 under control of the controller 4210.

The nonvolatile memory device 4230 may be used as a storage medium of the data storage device 4200.

Figure 11:
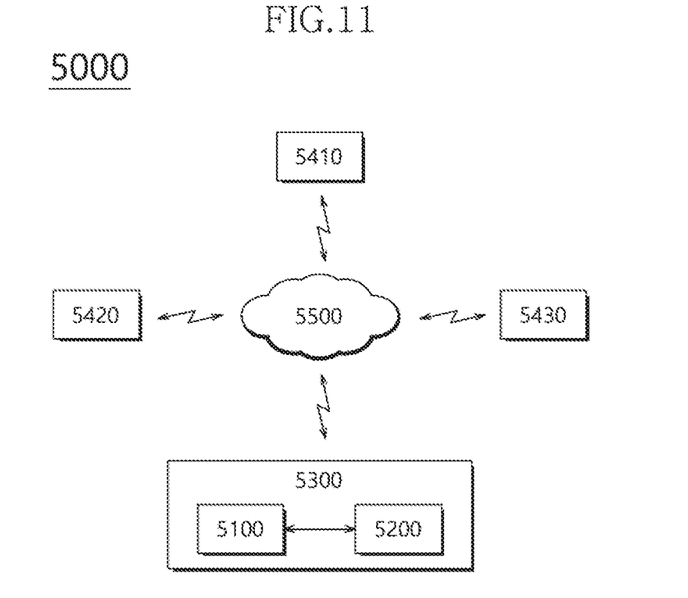
FIG. 11 is a diagram illustrating a network system including a data storage device in accordance with an embodiment.

FIG. 11 illustrates a network system 5000 including a data storage device in accordance with an embodiment of the present invention. Referring to FIG. 11, the network system 5000 may include a server system 5300 and a plurality of client systems 5410, 5420 and 5430 which are connected through a network 5500.

The server system 5300 may provide data in response to requests of the plurality of client systems 5410, 5420 and 5430. For example, the server system 5300 may store data provided from the plurality of client systems 5410, 5420 and 5430. For another example, the server system 5300 may provide data to the plurality of client systems 5410, 5420 and 5430.

The server system 5300 may include a host device 5100 and a data storage device 5200. The data storage device 5200 may be configured as the data storage device 10 of FIG. 1, the data storage device 2200 of FIG. 7, the data storage device 3200 of FIG. 9 or the data storage device 4200 of FIG. 10.

Figure 12:
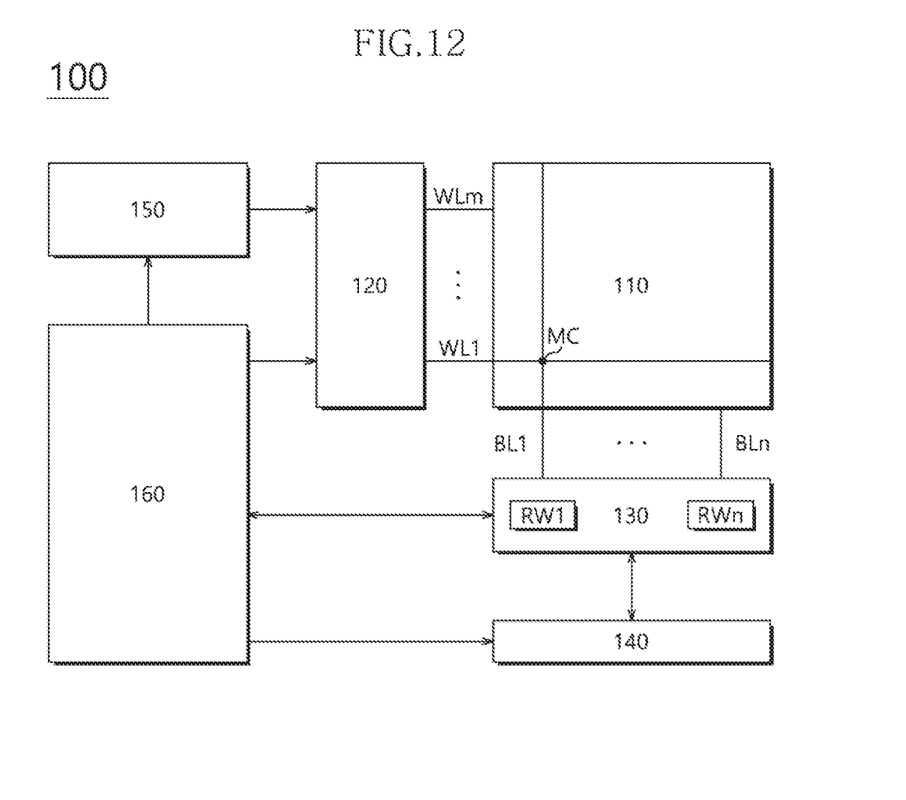
FIG. 12 is a block diagram illustrating a nonvolatile memory included in a data storage device in accordance with an embodiment.

FIG. 12 is a block diagram illustrating a nonvolatile memory included in a data storage device in accordance with an embodiment. Referring to FIG. 12, the nonvolatile memory 100 may include a memory cell array 110, a row decoder 120, a column decoder 140, a data read/write block 130, a voltage generator 150 and control logic 160.

The memory cell array 110 may include memory cells MC arranged at the respective intersections between word lines WL1 to WLm and bit lines BL1 to BLn.

The row decoder 120 may be coupled to the memory cell array 110 through the word lines WL1 to WLm. The row decoder 120 may operate under control of the control logic 160. The row decoder 120 may decode an address provided from an external device (not illustrated). The row decoder 120 may select and drive the word lines WL1 to WLm based on the decoding result. For example, the row decoder 120 may provide word line voltages provided from the voltage generator 150 to the word lines WL1 to WLm.

The data read/write block 130 may be coupled to the memory cell array 110 through the bit line BL1 to BLn. The data read/write block 130 may include read/write circuits RW1 to RWn corresponding to the respective bit line BL1 to BLn. The data read/write block 130 may operate under control of the control logic 160. The data read/write block 130 may operate as a write driver or sense amplifier depending on operation modes. For example, the data read/write block 130 may operate as a write driver which stores data provided from the external device in the memory cell array 110, during a write operation. For another example, the data read/write block 130 may operate as a sense amplifier which reads data from the memory cell array 110, during a read operation.

The column decoder 140 may operate under control of the control logic 160. The column decoder 140 may decode an address provided from the external device. The column decoder 140 may couple the read/write circuits RW1 to RWn of the data read/write block 130, corresponding to the respective bit lines BL1 to BLn, to a data input/output line (or data input/output buffer) according to the decoding result.

The voltage generator 150 may generate a voltage which is used for an internal operation of the nonvolatile memory 100. The voltages generated by the voltage generator 150 may be applied to the memory cells of the memory cell array 110. For example, a program voltage generated during a program operation may be applied to a word line of memory cells on which the program operation is to be performed. For another example, an erase voltage generated during an erase operation may be applied to well regions of memory cells on which the erase operation is to be performed. For another example, a read voltage generated during a read operation may be applied to a word line of memory cells on which the read operation is to be performed.

The control logic 160 may control overall operations of the nonvolatile memory 100 based on a control signal provided from the external device. For example, the control logic 160 may control an operation of the nonvolatile memory 100, such as a read, write or erase operation of the nonvolatile memory 100.

In accordance with embodiments of present embodiment, it is possible to measure latency of the data storage device.

While various embodiments have been illustrated and described, it will be understood by those skilled in the art in light of the present disclosure that the disclosed embodiments are examples only. Accordingly, the present invention is not limited to any of the described embodiments; rather, the present invention encompasses all variations and modifications that fall within the scope of the claims and their equivalents.

What is claimed is:

1. A data storage device comprising:
a nonvolatile memory; and
a controller configured to control an operation of the nonvolatile memory,
wherein when a command is received from a host, the controller transfers first state information as a response to the command to the host, the first state information including first time information indicating time difference from when the command is received to when a task corresponding to the command is generated and stored,
wherein when a task execution command is received from the host, the controller transfers second state information as a response to the task execution command to the host, the second state information is including second time information indicating time difference from when the task execution command is received to when the task is completed.

2. The data storage device according to claim 1, further comprising a memory including a task queue configured to queue the task.

3. The data storage device according to claim 1, wherein the first time information includes information of time taken by the controller to generate the task.

4. The data storage device according to claim 1, wherein the second time information includes information of time taken by the controller to generate a control signal for performing an operation corresponding to the task in response to the received task execution command and to provide the generated control signal to the nonvolatile memory and information of time taken by the nonvolatile memory to complete the operation corresponding to the task.

5. The data storage device according to claim 1, wherein the first state information further includes task generation state information indicating that the generation of the task is completed.

6. The data storage device according to claim 5, wherein the first state information includes a plurality of bits, first bits of the plurality of bits are set to indicate the first time information, and second bits of the plurality of bits are set to indicate the task generation state information.

7. The data storage device according to claim 1, wherein the second state information further includes task execution state information indicating that the task is completed.

8. The data storage device according to claim 7, wherein the second state information includes a plurality of bits, first bits of the plurality of bits are set to indicate the second time information, and second bits of the plurality of bits are set to indicate the task execution state information.

9. The data storage device according to claim 1, wherein the command is related to an operation to be performed by the nonvolatile memory.

10. The data storage device according to claim 1, wherein the task execution command causes the nonvolatile memory to perform an operation corresponding to the task.

11. An operating method of a data storage device which includes a nonvolatile memory and a controller configured to control an operation of the nonvolatile memory, the operating method comprising:

generating and storing a task corresponding to a command received from a host;
transferring first state information as a response to the command to the host, the first state information including first time information indicating time difference from when the command is received to when the task is generated and stored;
controlling the nonvolatile memory to perform an operation corresponding to the task according to a task execution command received from the host; and
transferring second state information as a response to the task execution command to the host, the second state information including second time information indicating time difference from when the task execution command is received to when the task is completed.

12. The operating method according to claim 11, wherein the generating and storing of the task comprises:
recording a first time point indicating when the command is received;
recording a second time point indicating when the task is generated and stored; and
generating the first time information indicating difference between the first and second time points.

13. The operating method according to claim 12, wherein the first state information comprises a plurality of bits, first bits of the plurality of bits are set to indicate the first time information, and second bits of the plurality of bits are set to indicate information indicating whether the generation of the task has been completed.

14. The operating method according to claim 11, wherein the controlling of the nonvolatile memory to perform the operation corresponding to the task comprises:
recording a third time point indicating when the task execution command is received;
recording a fourth time point indicating when the operation corresponding to the task is completed; and
generating the second time information indicating difference between the third and fourth time points.

15. The operating method according to claim 14, wherein the second state information comprises a plurality of bits, first bits of the plurality of bits are set to indicate the second time information, and second bits of the plurality of bits are set to indicate information indicating whether the execution of the task has been completed.

16. The operating method according to claim 11, wherein the command is related to an operation to be performed by the nonvolatile memory.

17. The operating method according to claim 11, wherein the task execution command causes the nonvolatile memory to perform an operation corresponding to the task.

18. A data storage device comprising:
a memory device; and
a controller configured to provide first and second processing time information to an external element,
wherein the first processing time information represents time taken for the controller to generate a task in response to a first command provided from the external element, and
wherein the second processing time information represents time taken for the controller to complete an execute of the task in response to a second command provided from the external element.

* * * * *